US006453937B1

(12) United States Patent
Tobias

(10) Patent No.: US 6,453,937 B1
(45) Date of Patent: Sep. 24, 2002

(54) HOT GAS VALVE CONSTRUCTION FOR REDUCING THERMAL SHOCK EFFECTS

(75) Inventor: Lee A. Tobias, Laguna Niguel, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 34 days.

(21) Appl. No.: 09/599,083

(22) Filed: Jun. 21, 2000

Related U.S. Application Data

(60) Provisional application No. 60/139,804, filed on Jun. 21, 1999.

(51) Int. Cl.$^7$ .............................................. F16K 53/00
(52) U.S. Cl. ...................... 137/334; 137/468; 251/368; 165/96
(58) Field of Search ................................ 137/334, 468; 165/96; 251/368

(56) References Cited

U.S. PATENT DOCUMENTS

| 3,243,313 | A | * | 3/1966 | Aves, Jr. ................. 244/117 A |
| 4,031,605 | A | * | 6/1977 | Couch et al. ................. 29/460 |
| 4,161,212 | A | * | 7/1979 | Hightower .................... 165/96 |
| 4,852,645 | A | * | 8/1989 | Coulon et al. ............... 165/180 |
| 5,536,562 | A | * | 7/1996 | Tran et al. .................. 426/218 |
| 5,720,339 | A | * | 2/1998 | Glass et al. ............. 165/104.26 |

* cited by examiner

Primary Examiner—A. Michael Chambers
(74) Attorney, Agent, or Firm—Andrew C. Aitken; Venable Baetjer Howard & Civiletti, LLP

(57) ABSTRACT

A system (and accompanying method) for reducing thermal shock in a physical device includes: a gas inlet portion; and an ablator material positioned in the gas inlet portion to reduce a temperature differential at a surface between the gas inlet portion and a gaseous material propelled through the gas inlet portion. The gas inlet portion can include: a first material; and a second material having a boundary with the first material, where the ablator material is positioned at the boundary. The first material is not sensitive to thermal shock, and the second material is sensitive to thermal shock. The ablator material can be housed in a recess at the boundary. The first material can be a manifold. The second material can be a portion of a control valve for controlling the direction and amount of a hot gas emitted therefrom. The manifold can include a bypass slot connecting a main inlet gas chamber of the manifold with a surface of the ablator material. A portion of the manifold between the bypass slot and the main inlet gas chamber can be diverted to block a portion of the volume of the main inlet gas chamber. A portion of the ablator material can protrude into the main inlet gas chamber. A portion of the manifold can protrude into the main inlet chamber to form an eddy gas current in contact with the ablator material and behind the manifold. A portion of the ablator material can also protrude into the main inlet gas chamber. The ablator material can be comprised of a material having little residue upon burning and which changes directly from a solid to a gaseous form without first changing to a liquid intermediate form.

18 Claims, 9 Drawing Sheets

HOT GAS VALVE CONSTRUCTION FOR REDUCING THERMAL SHOCK EFFECTS

The following is a non-provisional utility patent application claiming priority from pending provisional application, Serial No. 60/139,804, filed Jun. 21, 1999 which is hereby incorporated by reference in its entirety.

BACKGROUND OF THE INVENTION

1. Field of the Invention

The following invention relates generally to high temperature gas valves and more particularly to a technique for reducing the effects of thermal shock upon a high temperature gas valve.

2. Related Art

Vehicles that propel through outer space must withstand extreme conditions, unlike any encountered on earth. For example, a space vehicle must withstand temperatures near absolute zero (zero degrees Kelvin), while burning fuels at extremely high temperatures (in the thousands of degrees) for attitude control, which is the control of the vehicle position and velocity in outer space.

The way a space vehicle moves in a solid propellant-based system is as follows. A propellant is burned (which has mass) generating gas (that has mass with a velocity). The velocity direction of ejection is controlled through a series of manifolds, leading to control valves and thrust systems. The valves control the amount of propellant and the direction of its travel, thus controlling the attitude of the vehicle. Very precise control must be maintained over how much impulse is delivered in any given direction. These decisions are made by an onboard flight control computer that decides what corrections are necessary, and the computer then communicates those signals electrically to the control valves.

One great problem is that the control valves, which are advantageously constructed of thermal shock sensitive materials, are exposed to the extreme temperature differentials between the hot inlet gas and the cold of outer space. The valves are constructed of solid materials which are required to have significant physical strength at the temperatures at which they operate.

The trend in recent years has been to adopt higher and higher flame temperatures (to heat the propellant) in order to get a propulsive efficiency gain. Higher flame temperatures allow the packaging of more energy in a given pound of propellant and, therefore, greater thrust per a given space (or mass metric) in a satellite or missile system space vehicle.

There is a certain amount of space or mass allocated to an attitude control system (or a main thrust propulsive system). To the extent that the propulsion designer (the designer of the gas generator or the rocket motor) can raise the flame temperature of the combusting propellant system, the more energy can be packed into a given volume or mass. This technology trend has been ongoing since the beginning of the propulsion history.

What limits how high a temperature such systems can achieve is generally the performance limits of the physical devices that are connected to the rocket motor or the gas generator, which are for example, the valve and the manifold system in the attitude control system and the rocket nozzle, associated with the main rocket motor propulsion type system.

As noted, thermal shock is created by the differential between the hot inlet propellant gases and the cold of outer space. The temperature difference between the core of the material (of the valve for example) and the surface of the material results in very high stresses, because the surface rapidly expands or rapidly contracts depending on the direction of the temperature change. The underlying core material has little time to react because the temperature pulse has not reached it. The change in expansion or contraction creates a stress field which is destructive to the material of the device.

Thermal shock is most destructive for brittle materials that cannot stretch very far to accommodate the temperature change without failing, or rupturing, or cracking. This thermal shock sensitive behavior occurs most often in physical devices where brittle materials (such as graphite and ceramics) are employed to withstand high temperature changes because these materials are most resistant. Such brittle materials are employed for control valves, which are subjected to very high rates of heating.

The problem of thermal shock has been attacked in a number of ways. One method is to select different materials that are more ductile, which stretch rather than crack when these thermally induced strains are forced on them by the temperature differences. However, this solution is frequently not workable for rocket propulsion space vehicles, where temperatures range between 3,000–5,000° F., because the propellant temperatures are so high that few materials have usable strength at these temperatures.

At these temperatures, carbon materials (e.g., diamond, graphite) and certain ceramics compositions (e.g., nitrides and carbides) and a few varieties of metals (e.g., tungsten, tantalum, molybdenum) are usable. Many of these materials are brittle, making them quite thermal shock sensitive.

A second solution is to decrease the amount temperature of the inlet propellant gas. However, as noted, extreme temperatures differentials are needed for modem space vehicles, to promote efficiencies of the propellant system.

A third solution is to decrease the time rate of the change of temperature, which is different than just the actual temperature, itself. Taking a material to a very high or very low temperature quickly exaggerates the difficulty of the thermal shock challenge to the material. There are two competing rates that take place in the physics of the thermal shock. One is the rate at which heat is either donated to or liberated from (extracted from) the surface of the material.

The second rate is the rate at which the heat is internally redistributed within the material. To the extent that temperature is delivered extremely rapidly or heat is delivered extremely rapidly to the surface of the part and not removed (or dissipated) to the interior of the part by conduction at an equally rapid rate, the heat accumulates spatially at the surface layers of the part and, therefore, creates a much stronger gradient (or rate of change) on the material part. This produces very high changes in thermally-induced strains, and results in very high stress fields (or very high stress differences) from one layer in the part to the next layer.

If that same temperature rise is delivered over a longer period of time, the two competing rates will end up having a different balance. The first conduction rate that pulls the heat away from the surface and redistributes it will offset the second rate, thus tending to equalize the temperature of the part throughout the thickness of the part. This gives the material of the part more time to cope with the influx of heat at the surface and, therefore, does not accumulate or build up a large temperature gradient throughout the thickness of the part. The reason is because the internal conduction mechanism has more time to pull the heat away and prevents it from literally accumulating at the surface.

What is required is a satisfactory method to reduce the rate of temperature change to reduce the level of thermal shock stresses, in particular for brittle material parts used to cope with sudden exposure to extreme temperatures. This method, and system for employing the method, must reduce the rate at which heat is donated to the surface of the material, to more closely equal the rate at which the heat is internally redistributed within the material.

SUMMARY OF THE INVENTION

The present invention is directed to a system (and accompanying method) for reducing thermal shock in a physical device, including: a gas inlet portion; and an ablator material positioned in the gas inlet portion to reduce a temperature differential at a surface between the gas inlet portion and a gaseous material flowing through the gas inlet portion. The gas inlet portion can include: a first material; and a second material having a boundary with the first material, where the ablator material is positioned at the boundary. In one embodiment, the first material is not sensitive to thermal shock, and the second material is sensitive to thermal shock. The ablator material can be housed in a recess at the boundary.

The first material can be a manifold. The second material can be a portion of a control valve for controlling the direction and amount of a hot gas emitted therefrom. The manifold can include a bypass slot connecting a main inlet gas chamber of the manifold with a surface of the ablator material.

A portion of the manifold between the bypass slot and the main inlet gas chamber can be diverted to block a portion of the volume of the main inlet gas chamber. A portion of the ablator material can protrude into the main inlet gas chamber. A portion of the manifold can protrude into the main inlet chamber to form an eddy gas current in contact with the ablator material and behind the manifold. A portion of the ablator material can also protrude into the main inlet gas chamber.

The system can further include a consumable ring protruding into the main inlet gas chamber and positioned in contact with the ablator material, where the consumable ring is comprised of a material which consumes less rapidly than the ablator material. The ablator material can protrude into the main inlet gas chamber.

The ablator material can be comprised of a material having little residue upon heating and if possible, one which changes directly from a solid to a gaseous form without first changing to a liquid intermediate form. Specifically, the ablator material can be comprised of any one of: a paraffin material; a polyethylene material; a thermoplastic material; an octadecane material; and a phenolic material. The ablator material can also be comprised of a first material and any one of: a graphite powders filler; a talcum powder filler; and a phase change salt filler.

BRIEF DESCRIPTION OF THE FIGURES

The present invention will be described with reference to the accompanying drawings, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

In the following description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
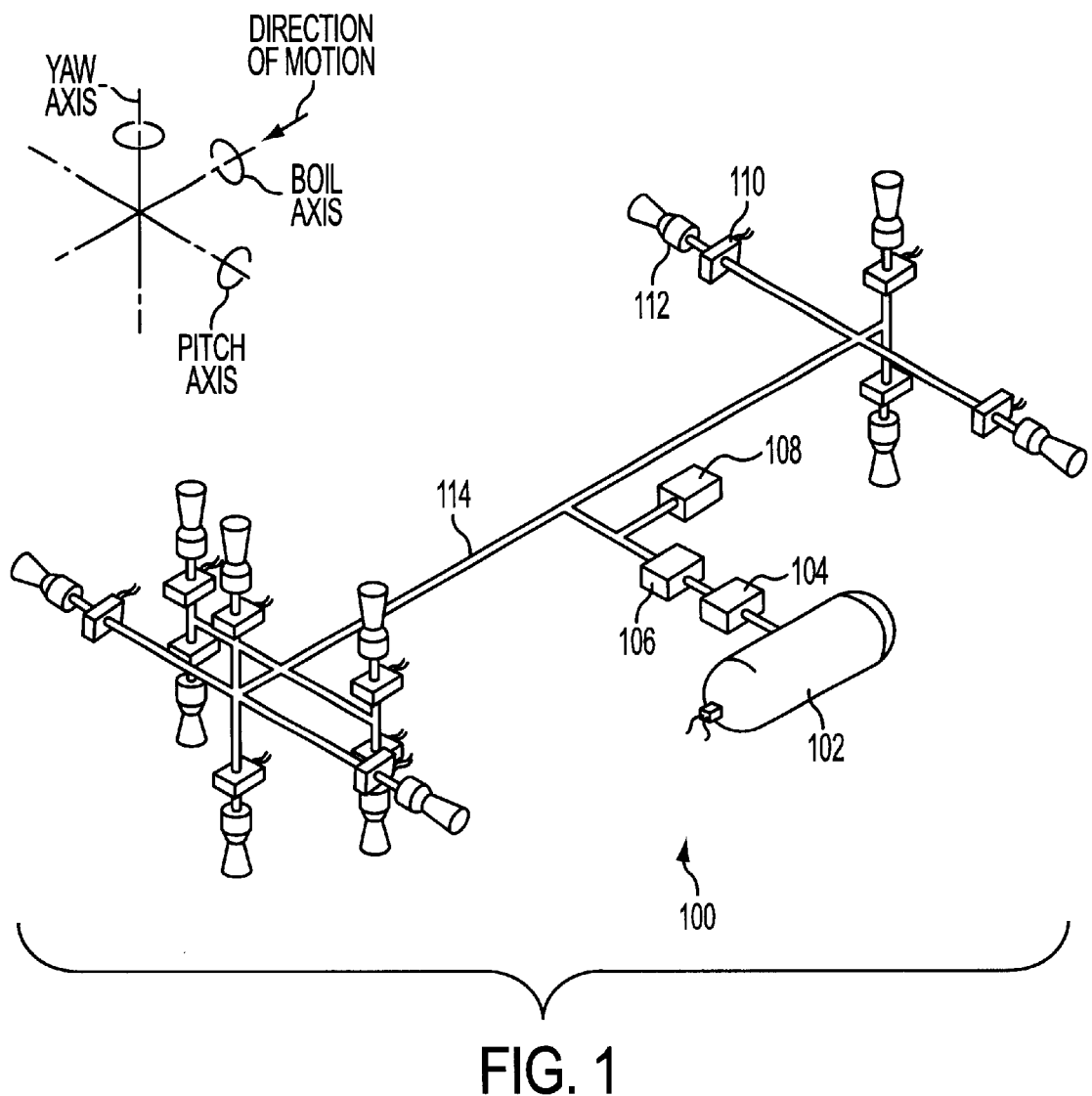
FIG. 1 illustrates an exemplary solid propellant based attitude control system.

The following discussion relating to FIGS. 1 through 5E is provided by way of background information, although when combined with the inventive concepts provided herein, can provide novel features of the present invention on its own merits. FIG. 1 is an exemplary solid propellant-based attitude control system 100. Solid propellant based control system 100 includes igniter and solid propellant 102, burst diaphragm valve 104, filter 106, relief valve 108, a number of hot gas flow control valves 110, a number of thrust nozzles 112, and manifold 114.

Solid propellant generator 102 is a cylindrical object with the igniter shown. It is connected through a series of manifold 114 through a variety of outlets at thrust nozzles 112. Solid propellant generator 102 creates a flow of very hot gas under high pressure, which is then conducted through branched manifold 114, then is supplied to valves 110 that feed the gas through thrust nozzles 112, producing a reaction force which is used by a spacecraft or body under control to maintain a prescribed attitude or gain an orientation.

Attitude refers to a position described by x, y and z coordinate distances. It is the orientation of the spacecraft body, both in the direction it is traveling and with respect to which side is facing the forward direction. In other words, attitude includes the position and velocity vectors controlling the spacecraft as a moving body.

In the vacuum of space there is no surface to push off of to gain velocity, unlike a conventional aircraft, which would exert or generate control forces to move itself by deflecting the flow of the atmospheric air acting as control surfaces. In the vacuum of space, there is no atmosphere, so the only way to generate a force by conventional means is to propel (or discard) mass away in a certain direction, creating a reaction force.

The way this is done in a solid propellant based system is that propellant is burned, which has mass, generating gas that has mass with a velocity. The velocity direction of ejection is controlled through the branch manifold 114, control valves 110 and thrusts nozzles 112 in system 100.

It is required that very precise control be maintained over how much impulse (or force times time) is delivered in any given direction. These decisions are made by an onboard flight control computer that decides what corrections are necessary. The computer then communicates those signals electrically to the hot gas flow control valves 110.

Accordingly, the exit planes of the reaction nozzles 112 are close to flush with the surface skin of the aircraft. It is not desirable to let the gases go inside the aircraft because the gases are very hot and destructive, and if the body of the aircraft protrudes out into the airstream outside of the aircraft, it creates aerodynamic penalties as the aircraft increases in attitude.

In the illustrated embodiment of FIG. 1, the schematic shows separate and distinct valves 110 and nozzles 112, meaning that each one of the valves is separate from the nozzles and each one of the valve nozzle pairs are separate from one another. However, those skilled in the art will recognize that an efficient way to handle the same functions is to provide an integrated valve system, where the functionality of multiple valves and multiple nozzles are physically "siamesed" (or connected) together into a single assembly with a common gas inlet port.

Figure 2:
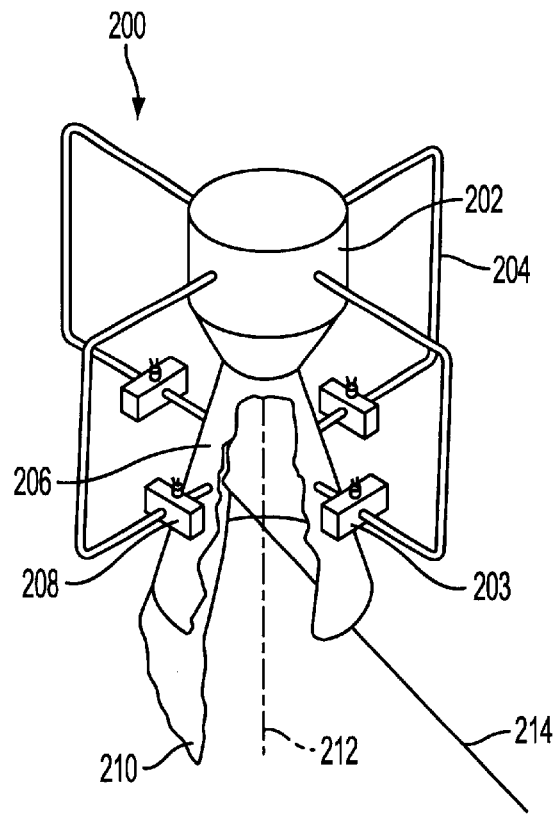
FIG. 2 illustrates an exemplary bypass gas injection system.

FIG. 2 illustrates an exemplary bypass gas injection system 200. This system uses a thrust chamber bleed thrust vector control. Bypass gas injection system 200 includes a combustion chamber 202, manifolding or bypass lines 204, expansion cone 206, and injectant flow control valves 208. Combustion chamber 202 includes a gas generation source (not shown) that can be either a liquid (wherein two liquid gas reactants are combusted to produce hot gases) or a solid propellant. The majority of the gas projects down the main reaction nozzle in a vertical direction along the axis of expansion cone 206. A small percentage of the chamber gas is permitted to bleed out through the 4 bypass lines 204 inside expansion cone 206 under the control of valves 208. Valves 208 are computer controlled to permit certain amounts of gas to be bled in to deflect the main exhaust stream 212. The deflection of the main exhaust stream 212 by the gases bled in via valves 208 creates a shock wave 214.

Figure 3:
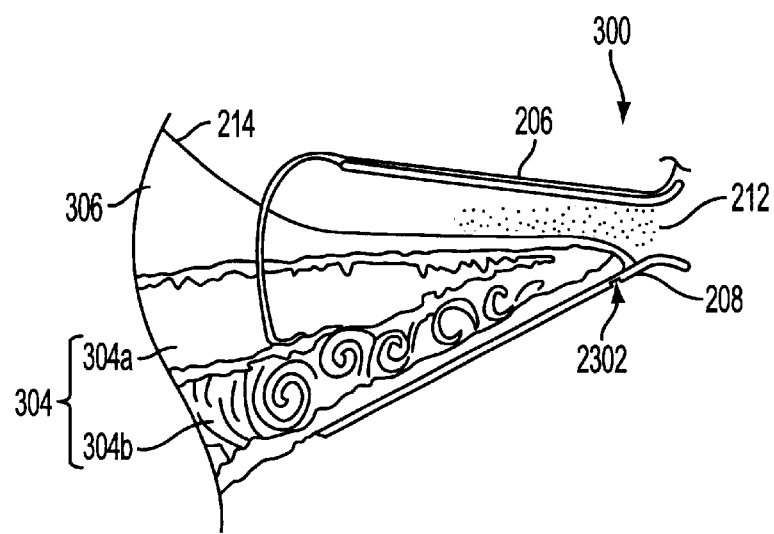
FIG. 3 illustrates the mechanism by which injection gas creates a thrust force vector.

FIG. 3 illustrates system 300, the mechanism by which the injection gas (or bled gas) redirects the nozzle flow and provides a resulting thrust force vecter. In system 300, exhaust gases 212 are the main gases directed from combustion chamber 202. The bled gas or injectant gas 302, is controlled by valves 208 and permitted to enter expansion cone 206. A collision occurs between injectant gas 302 and exhaust gases 212. This skews the exhaust gases 212 in a direction opposite the injected gas 302, creating shock wave 214. The deflected exhaust gases are illustrated as element 306. A volume blockage gas 304 is also created, which serves to further deflect exhaust gases 212. Blockage gas 304 comprises a vortex stream portion 304b, wherein trapped gases take on a circular motion, and a secondary mixing zone 304a, wherein the injected gas 302 and exhaust gases 212 share a dynamic mixing boundary.

Figure 4:
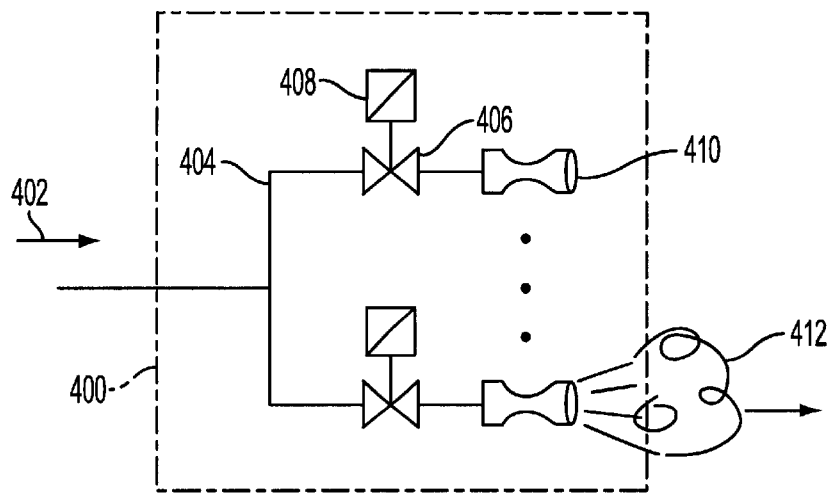
FIG. 4 illustrates an exemplary integrated hot gas valve.

FIG. 4 illustrates an exemplary integrated hot gas valve 400. Integrated hot gas valve 400 includes a gas inlet 402, manifolding 404, throttles 406, solenoids 408, and thrust nozzles 410. Solenoids 408 and throttles 406 together comprise valves, controlling the flow of gas 402 for manifolding 404 into thrust nozzles 410. The gas is released from thrust nozzles 410, shown as 412, causing a thrust force. In place of solenoids 408, piezoelectric actuation systems can be used instead, where a voltage is applied to a piezoelectric material that dilates or contracts under the effect of the electric field, producing a motion that can be used to actuate the valve.

Figure 5A:
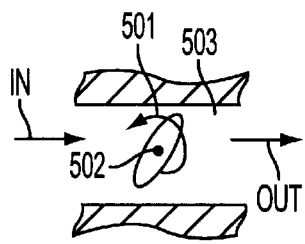
FIGS. 5A, 5B, 5C, 5D and 5E illustrate exemplary valves.

There are a number of ways of producing a variable or controllable flow area within the valve. Different types of throttling or shut-off elements are illustrated in FIGS. 5A–5E. FIG. 5A illustrates a butterfly type of valve, commonly used in carburetors and fuel injection systems, and includes a paddle or vane 501 positioned on an axle 502 dispositioned in the center of a flow area 503 (typically a circular tube). When paddle 501 is rotated into a streamline position, it offers very little obstruction and permits the free-flow of gas. On the other hand, when paddle 501 is rotated at a 90° angle, it blocks the flow area 503 and prevents the flow of gas.

Figure 5B:
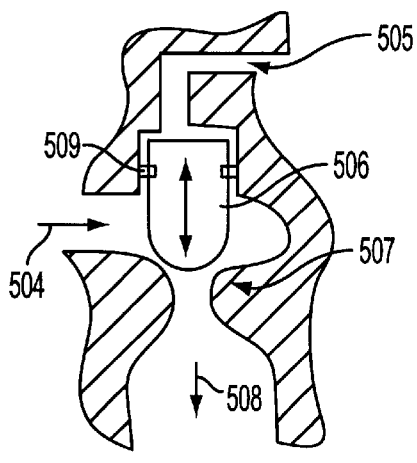

FIG. 5B illustrates a pilot-operated 2-stage valve. Illustrated in FIG. 5B are input gas 504, actuation fluid 505, free-floating piston 506, seat 507, output gas 508, and seal 509. In the pilot-operated 2-stage valve, the control of actuation fluid 505 pressure level causes free floating-piston 506 to advance in an upward or downward direction. Seal 509 prevents actuation fluid 505 from penetrating the gas chamber, where input gas 504 and output gas 508 flow. When the pressure on actuation fluid 505 is sufficient, piston 506 rests on seat 507, completely blocking the outflow of gas 504. Otherwise, input gas 504 is permitted to flow out as output gas 508.

Figure 5C:
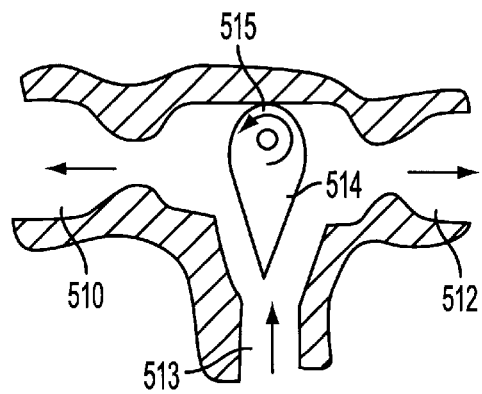

FIG. 5C illustrates a flapper divert valve. In the flapper divert valve, there are two outlets 510, 512, and one inlet 513. The flow of fluid is divided between outlets 510 and 512, and is never shut off entirely. Rather, the fluid flow is apportioned between the two opposite acting outlets 510, 512 by the action of flapper 514 rotating on axle 515. The flapper is connected to reaction nozzles, which roll the flapper to the left and to the right.

Figure 5D:
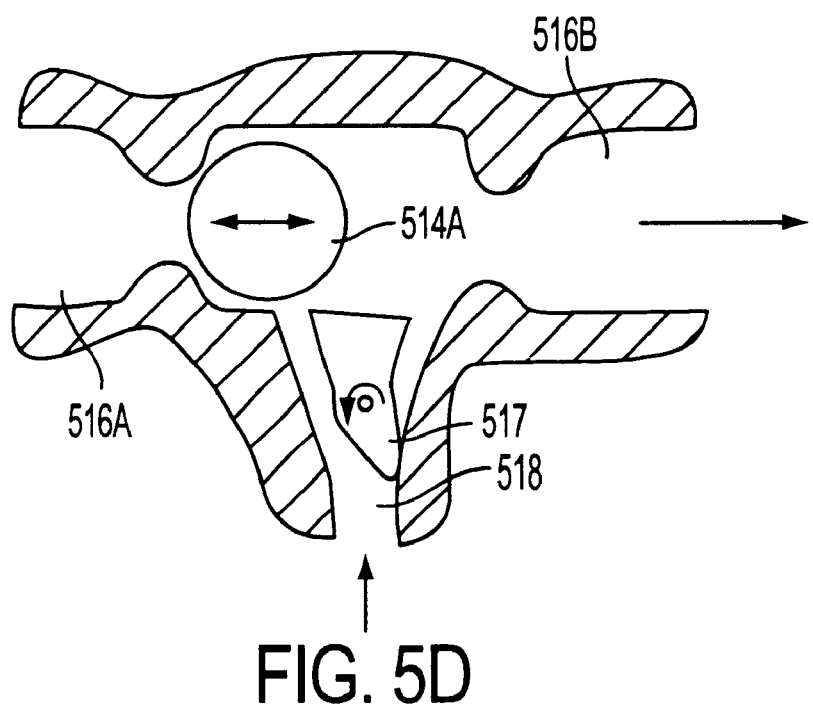

FIG. 5D provides a variation of the flapper divert valve, specifically a 2-stage flapper-pilotted divert valve. This valve includes rolling ball 514a, flapper 517, inlet 518, and outlets 516a, 516b. Here, rolling ball 514a is predisposed to shut off completely rather than proportionately, making it more of a digitally acting device. Ball 514a (or a similar element) can be disposed to shut off against two outlet seats by the action of rotating flapper 517, creating a jet of gas that tends to locate and then pin the free-floating ball 514a against one of the two outlet seats. Hence, flapper 517 controls which outlet (516a or 516b) the inlet 518 gas will flow into.

Figure 5E:
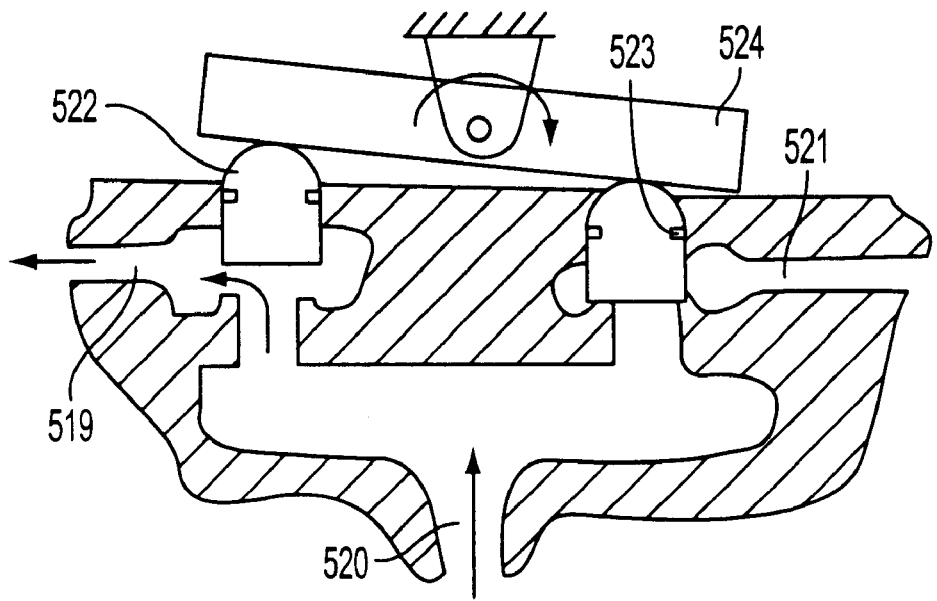

FIG. 5E illustrates a walking beam 2-way divert valve. This valve comprises a force balancing rocker 524, poppets 522, 523, outlets 519, 521 and inlet 520. When a force is applied to rocker 524, it teeter-totters, forcing one of poppets 522, 523 downward against a seat, and permitting the other poppet to be pushed upward against rocker 524 by fluid injected at inlet 520. The poppet that is pushed upward against rocker 524 permits fluid applied at inlet 520 to flow freely through its outlet. As illustrated, poppet 522 permits fluid forced at inlet 520 to flow out through outlet 519.

Figure 6:
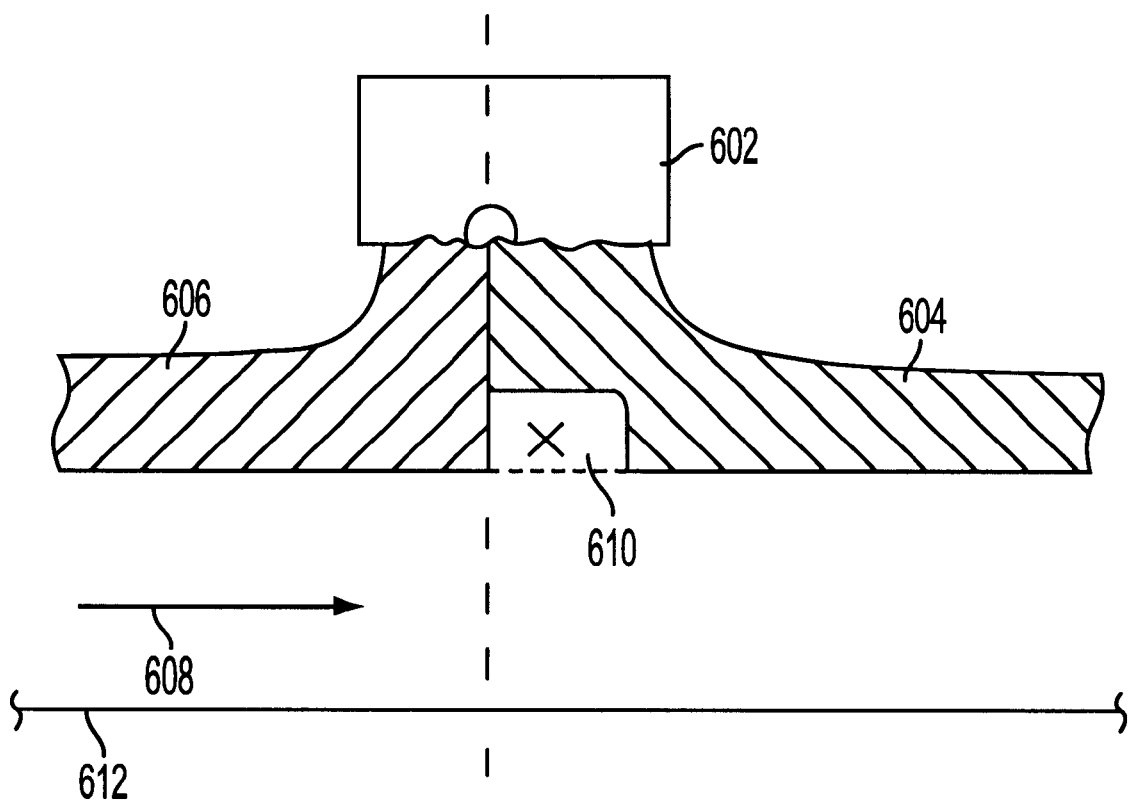
FIG. 6 illustrates an ablator material as provided in the present invention, as located near a hot gas inlet.

The following discussion begins the substantive portion of the present invention. FIG. 6 illustrates the location of an ablator as provided in the present invention at or near a hot gas inlet. FIG. 6 is a cross sectional view, showing coupling nut 602, inlet manifold 606, the gas inlet portion of a valve body 604 (the rest of which is not shown), gas inlet 608 housing an inlet gas (gas that enters the valve from the manifold), and an "X" labeled recess 610 for holding an ablator material. The structure illustrated is a cross-section of a toroid shaped structure, one that is generated by rotating the illustrated structure around axis 612. In other words, the actual structure is obtained from rotating the illustrated structure in an annular fashion about axis 612 such that there is a mirror image of the structure shown immediately below it.

Manifold 606 is a portion of the structure through which gas enters the valve. Specifically, gas held in gas inlet 608 travels toward the valve from valve body 604. Manifold 606 is a portion of the gas inlet that is non-thermal shock sensitive (is not sensitive to thermal shock).

Valve body 604 is a portion of the valve (not illustrated in its entirety). Valve body 604 is a portion of the inlet manifold that is constructed of a material which is sensitive to thermal shock. Coupling nut 602 is the mechanical means by which valve 604 is coupled to manifold 606.

The ablator, which is inserted into recess 610, is a material which absorbs heat from the hot gases flowing through the valve for a period of time when it is exposed to those gases. It is a material that absorbs heat by a phase change or a reaction type of process. In one embodiment, the ablator is a material that melts or sublimes, going directly from a solid to a gas phase. In one embodiment, the ablator material is located in the valve itself, at the "upstream" end of the valve (at the border between the valve and the manifold). Essentially, this is the region where the valve begins and the manifold ends.

The purpose of the ablator is to mitigate thermal effects that take place in the valve when it is suddenly exposed to extremely hot gases. When very hot gases are sent in inlet 608, a thermal shock stress field can develop that will crack or shatter the valve, or other valve structures (such as the thrust nozzle). It is preferable to cool the gas adjacent to the wall of the valve body to diminish stress and maximize thrust, as well as to cool the leading edge of the heat pulse in time, both of which the present invention accomplishes through the use of the ablator. It is the purpose of the ablator material to reduce or prevent the thermal shock, by cooling the gas a set amount before the gas penetrates the valve. In the illustrated embodiment, because the gas flow is directional in entering the valve (from left to right in the figure), the heat absorption effect of the ablator is essentially directional, and hence the ablator only protects structures that are downstream from it. In other embodiments, the gas flow can be made multidirectional.

In the present embodiment, by placing the ablator as far upstream as possible, the whole rest of the valve is downstream from it, and therefore would be protected by its beneficial effects. If the ablator is placed halfway through the valve, the part upstream would be unprotected and therefore vulnerable. As those skilled in the art will recognize, any number of ablator materials, each housed in separate recesses, can be provided in combination. For example, if the manifold system itself were thermal shock sensitive, then ablator materials can be placed in the housing of the manifold as well. The ablator material, housed in a recess, is referred to hereinafter as an ablator system.

Figure 7:
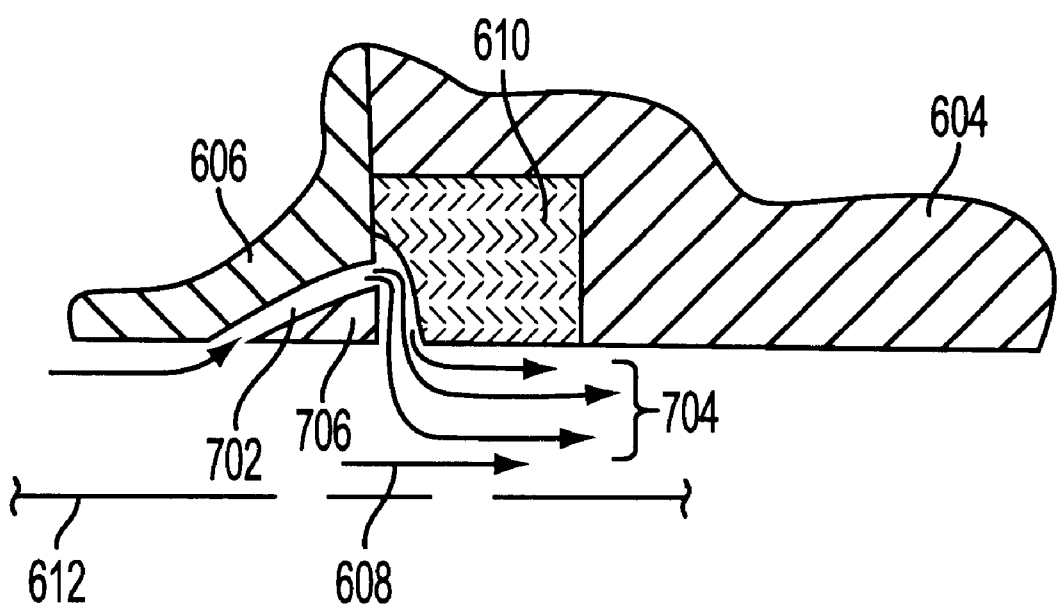
FIG. 7 illustrates a second embodiment of the structure of FIG. 6, which includes a manifold bypass port.

FIG. 7 illustrates a second embodiment of the structure of FIG. 6. The structure is similar to the structure of FIG. 6, but has been blown up to further illustrate the internal detail. Like FIG. 6, there is a manifold portion 606, a valve portion 604, a coupling nut (not shown), and an ablator recess housing an ablator material. However, this embodiment includes a manifold bypass port (or slot) 702. Slot 702 pierces the sidewall of the manifold 606, producing a jet of gas that would collide against the face of the ablator. Since the complete structure is derived by rotating the structure about axis 612 like a toroid, the slot is actually a sheet, permitting a sheet of hot gas to hit the surface of the ablator. In this embodiment, there are support struts (not shown) to ensure that section 706 of manifold 606 is not "loose" or free-floating. Upon hitting the ablator, the gas bled through slot 702 is cooled. This cooled bleed gas 704 combines with the main inlet gas in inlet 608, and cools it substantially. The cooled bleed gas 704 cools the inlet gas 608 at the surface of the thermal shock sensitive material of valve 604. This thin sheet of relatively cooled gas acts as an insulator or barrier between the extremely hot inlet gas 608 and the cold thermal sensitive material of valve 604.

An advantage of this embodiment is its low pressure drop. There are no gas diverter means projecting into the hot gas flow. Such diverters (illustrated in embodiments below) would reduce the flow of bleed gas 704 and inlet gas 608, reducing their pressures and making the structure less aerodynamically efficient. As the mass flow rate of the gas increases, the delivery duration of the gas decreases. Therefore, this embodiment puts more ablator material in the gas stream to reduce the surface temperature of the gas over a shorter period of time without creating a protrusion (or resistance to flow) in the gas flow passage.

A disadvantage comes from the same source as the above mentioned advantage (i.e., the lack of a diverter) in that by "scooping" only relatively low volumes of gas off of the main inlet gas 608, not enough of bleed gas 704 and inlet gas 608 are combined, thus not influencing the temperature of inlet gas 608 as much as sometimes desired. It should be noted that there is a trade-off between sending the whole flow through an ablator material and sending only the portion which is necessary to cool the boundary layer or the gas actually in contact with the moving parts of the valve.

A second disadvantage of this embodiment is that if the ablator is initially intact (a complete block), then it would block the flow of bleed gas 704 entirely. Hence, some gas paths must be molded into the ablator material initially, to induce the start of a bypass gas flow which then erodes the ablator material.

Figure 8:
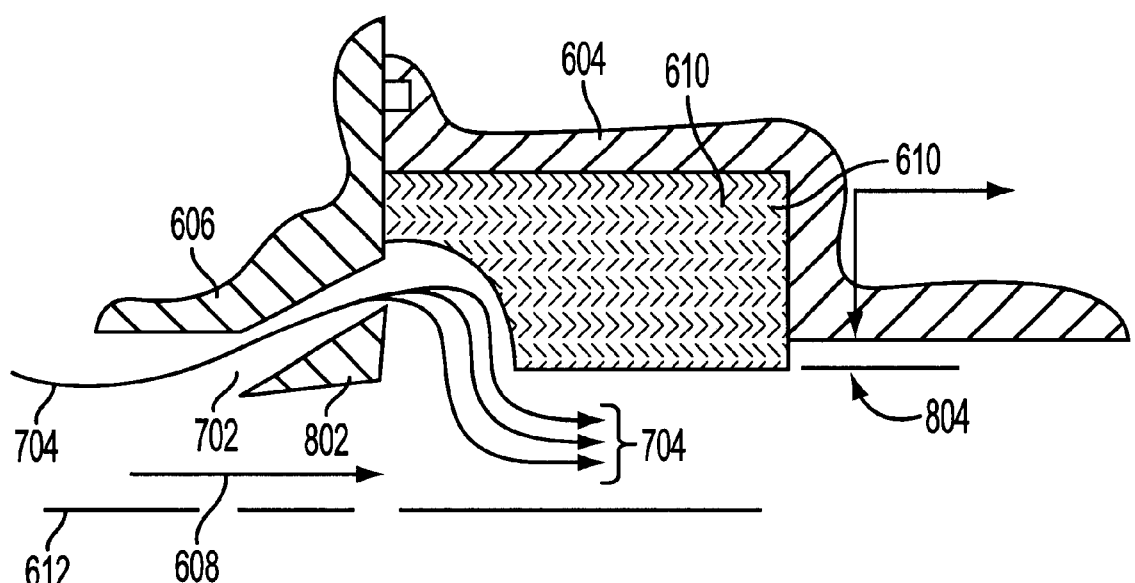
FIG. 8 illustrates another embodiment of the structure of FIG. 7, which includes a diverter to divert bleed gas away from the inlet gas.

FIG. 8 illustrates another embodiment, that is a variation of the structure of FIG. 7. The structure of FIG. 8 is different from the structure of FIG. 7 in two ways. First, triangular cross-section 802 replace the triangular cross-section 706 of manifold 606. Triangular cross-section 802 (a portion of the manifold, or alternatively any other gas inlet wall material, located between the bypass slot and the gas inlet chamber) acts as a diverter to divert more bleed gas 704 away from inlet gas 608. Triangular cross-section 802 has a hooded scoop structure, to divert the gas radially inward, to forcibly divert the gas in a much more effective way, and to increase the amount of bleed gas 704 through the bypass part 702 and against the face of the ablator block. This causes the pressure drop penalty alluded to above, but enhances the cooling of the gas in the main gas stream.

Second, the ablator block extends downward a distance 804 below the inner surface of valve body 604. This has the effect of diverting additional cooled bleed gas 704 between the surface of valve body 604 and hot inlet gas 608.

In this embodiment, the advantage over the embodiment of FIG. 7 is that by creating a greater bypass flow of gas, a larger percentage of inlet gas 608 is mixed with bleed gas 704, causing more potential for cooling the surface between inlet gas 608 and valve body 604.

The disadvantage is that there is more of a blockage effect on inlet gas 608, which is permanent. The manifold is a made of a non-eroding, non-ablating material. Once the ablator is used up, the ring diverter (which may be triangular cross-section 802, spun around axis 612 as a toroid) still persists in blocking the flow of inlet gas 608, causing a pressure drop. This places a penalty on the efficiency of the system, which continues long after the ablator is consumed. Another disadvantage is the difficulty of manufacturing the special design (i.e., more complex Shape) of triangular cross-section 802, versus non-hooded triangular regions 706.

Figure 9:
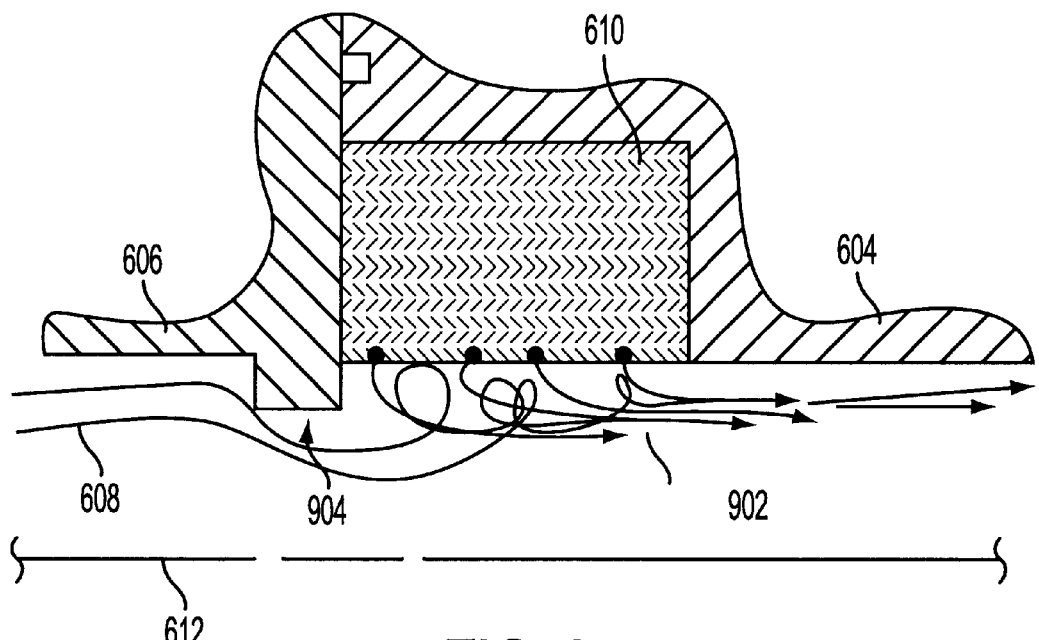
FIG. 9 illustrates another embodiment of the structure of FIG. 6, which includes an eddy-forming step projecting outward into a hot inlet gas chamber.

FIG. 9 illustrates an embodiment similar structurally to the embodiment of FIG. 6. The embodiment of FIG. 9 is different than the embodiment of FIG. 6 in that it includes an eddy-forming step 904, which projects outward into the hot inlet gas 608 chamber. Step 904 causes an eddy to be formed behind it. Portions of hit inlet gas 608 hit the ablator material and are cooled by the ablator material to form the eddy current. The eddy current and hot inlet gas 608 combine to form a cooler gas 902, which cools the inlet gas closest to the valve 604. By directing gas towards the ablator material more rapidly, this embodiment causing a greater cooling effect. One advantage of the structure of FIG. 9 is that it is simple and easy to manufacture. The disadvantage is that the eddy current may not access the deep ablator pockets sufficiently as the ablator material is consumed. Consequently, the cooling effect provided by the ablator material is much more pronounced before the ablator material has been absorbed in any sufficient amounts.

Figure 10:
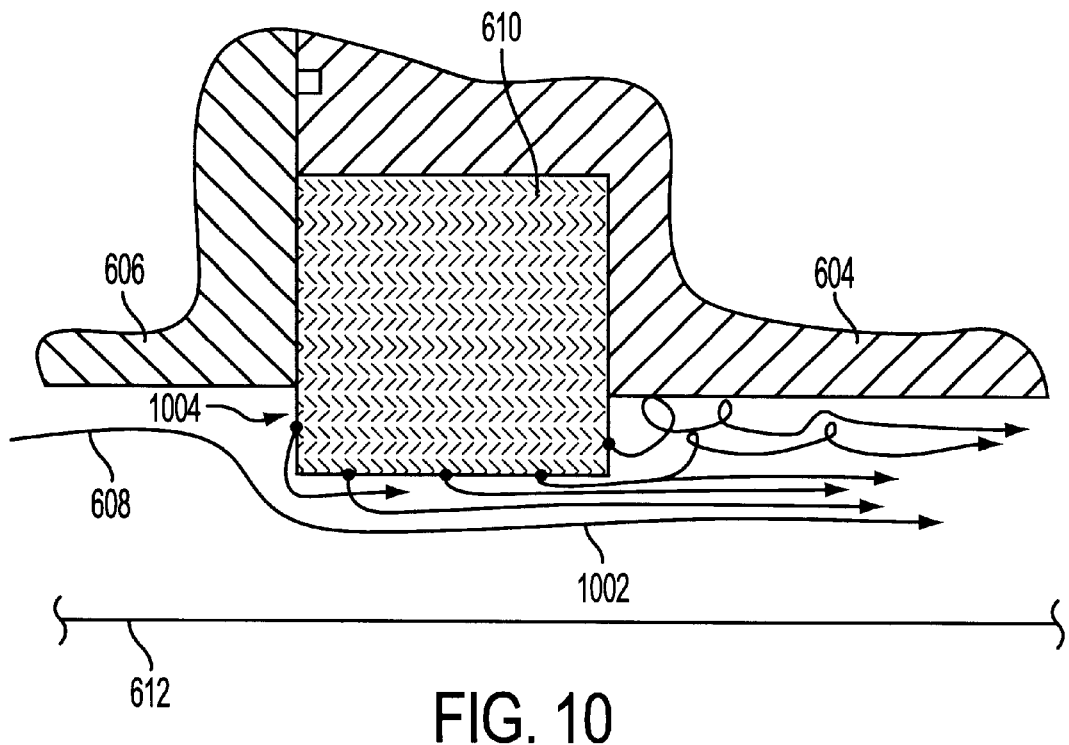
FIG. 10 illustrates another embodiment of the structure of FIG. 6, which includes ablator material in an ablator recess protruding a distance into the inlet chamber of the manifold.

FIG. 10 illustrates yet another embodiment similar in structure to the embodiment of FIG. 6. The embodiment illustrated in FIG. 10 has the ablator material in ablator recess 610 protrude a distance 1004 into the inlet chamber of the manifold 606. Hot gas 608 collides with the surface of the ablator material and carries away a substantial amount of cooled gas, creating newly cooled gas 1002. The advantage of the structure of FIG. 10 is that it is simple to manufacture and design. The disadvantage is that there is initially a high pressure drop of the inlet gas 608 because the ablator material protrudes directly into the manifold inlet gas chamber. Another disadvantage is that although the ablator material is consumed rapidly by the direct impact of the hot inlet gas 608 with the ablator material, it is consequently quickly consumed. In addition, once the protruding portions of the ablator material are used up, the cooling effects of the ablator material are rapidly depleted because it is more difficult for an eddy current to be created in the structure illustrated.

Figure 11A:
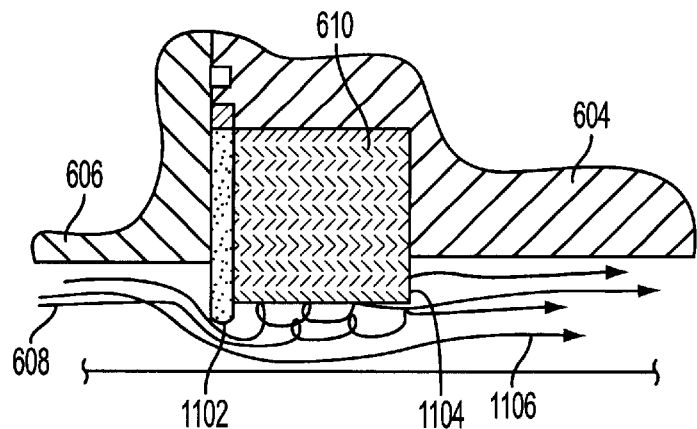
FIG. 11A, 11B and 11C illustrate another embodiment of the structure of FIG. 6, which includes the benefits of the structures of FIGS. 9 and 10 with the additional feature of a consumable eddy-forming step component.
Figure 11B:
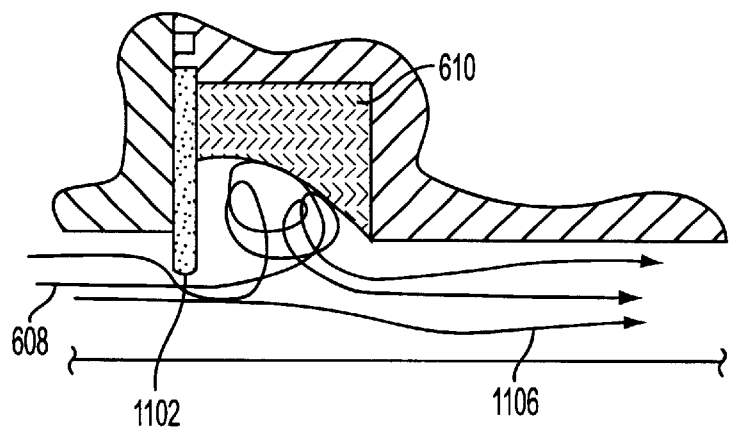
Figure 11C:
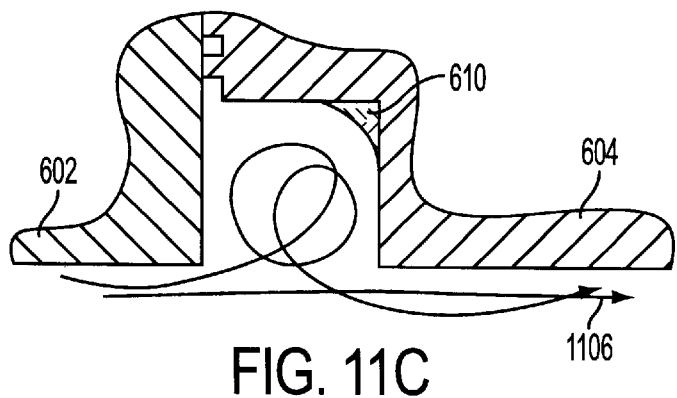

FIGS. 11A–11C illustrates yet another embodiment which is structurally similar to the embodiment of FIG. 6, maintaining the benefits but not the penalties of the embodiments of FIGS. 9 and 10. Referring to FIG. 11A, a consumable ring (flow diverter) 1102 is provided between the hot inlet gas 608 and the ablator material. In addition, a portion of the ablator material 1106 protrudes downward into the inlet gas chamber. Consumable ring 1102 is comprised of a material that is consumed less rapidly than the ablator material. Although consumable ring 1102 has ablative protective properties, it is optimized in property to be consumed less rapidly than the actual ablator material.

As illustrated in FIG. 11B, an eddy current is formed behind consumable ring 1102, consuming the ablator material and cooling the hot inlet gas 608 to form cooled gas 1106. Because the consumable ring 1102 is consumed less rapidly than the ablator material, as illustrated in FIG. 11C, consumable ring 1102 is consumed only after a substantial amount of the ablator material is used up. Thus, consumable ring 1102 is a material that, for a period of time, produces an eddy current allowing the full consumption and efficient deployment of the ablator material, and then having served its purpose, itself ablates away to leave a fairly smooth gas passage for hot inlet gas 608.

The following discussion relates to the materials used for the ablator, the consumable ring, any one of which can form either the ablator or the consumable ring (or can be used in combination to form either the ablator or the consumable ring). In one embodiment, the important parameter for the material is that it be "clean burning," meaning that it produces very little solid or liquid residue, if that residue is of a nature that would have a physical strength ("stickiness") to it. In this embodiment, the ideal material would turn directly from a solid into a gas without a sticky liquid phase and without much ash or slag types of residue. Phase change materials can be used, such as octadecane (a hydrocarbon wax that has a fairly high heat of vaporization and heat of fusion), which consume a fairly large quantity of heat when going from a solid to a vapor state.

There are a number of materials that either have a benign liquid phase or go directly from a solid to a gas, as will be recognized by those skilled in the art. Wax type materials (paraffin) and thermoset plastics are two materials that can be used. The family of thermoset plastics denoted as phenolic can be used. Polyethylene and related materials can also be used.

Yet other materials used for the ablator material include filler materials, which are added to base materials, to permit control of their mechanical strength or rate of ablation properties. Materials used as fillers include graphite powders, talc, talcum powder, and phase change salts, that adsorb heat in their transition from a solid to a gas under the action.

While the invention has been particularly shown and described with reference to preferred embodiments thereof, it will be understood by those skilled in the relevant art that various changes in form and details may be made therein without departing from the spirit and scope of the invention.

What is claimed is:

1. A high temperature gas valve comprising:
   an upper valve body made of non-thermal shock sensitive material;
   a lower valve body made of thermal shock sensitive material, said upper and lower valve bodies being coupled to form a surface and a gas inlet chamber where hot gas flows first through said upper valve body and then said lower valve body; and
   an ablator material disposed at the surface between said upper valve body and said lower valve body wherein said ablator material absorbs heat from the hot gas so that a cooler gas flows through said lower valve body thereby reducing a temperature differential at said surface and thermal shock when a hot gaseous material is propelled through said gas inlet chamber.

2. The high temperature gas valve according to claim 1, wherein said lower valve body has a recess adjacent said upper valve body and said ablator material is disposed in the recess.

3. The high temperature gas valve according to claim 2, wherein a bypass slot is formed in said upper valve body that pierces the surface of the surface of said upper valve body angling away from the flow of gas and terminating at a sidewall of said upper valve body adjacent said ablator material so that a portion of the flow of gas is directed into a face of the recessed ablator material.

4. The high temperature gas valve according to claim 3, wherein gas paths are molded into said ablator material to initiate the bypass gas flow which then erodes said ablator material.

5. The high temperature gas valve according to claim 3, wherein said upper valve body has a section which projects from the surface of said upper valve body into the flow of hot gas and the bypass slot is formed between the projecting section and the surface of said upper valve body, said projecting section acting as a diverter to divert more of the flow of gas into the face of the recessed ablator material.

6. The high temperature gas valve according to claim 5, wherein said ablator material protrudes past the surface of the gas inlet chamber into the flow of gas so that additional gas is cooled.

7. The high temperature gas valve according to claim 1, wherein said ablator material protrudes past the surface of the gas inlet chamber into the flow of gas so that additional gas is cooled.

8. The high temperature gas valve according to claim 1, wherein said ablator material erodes when it reacts with the flow of hot gas thereby cooling the hot gas.

9. The high temperature gas valve according to claim 8, wherein said ablator material melts or sublimes going from a solid phase to a gas phase when it is exposed to the flow of hot gas.

10. The high temperature gas valve according to claim 1, wherein said upper valve body forms a manifold and said lower valve body forms a control valve that controls the direction and amount of gas emitted therefrom.

11. The high temperature gas valve according to claim 1, wherein said ablator material is disposed at an upstream end of the high temperature gas valve.

12. The high temperature gas valve according to claim 1, wherein said upper valve body includes an eddy-forming step that protrudes into the inlet gas chamber, said eddy-forming step being adjacent said ablator material and causing portions of the flow of hot gas to hit said ablator material and form eddy gas currents.

13. The high temperature gas valve according to claim 1, further comprising a consumable ring protruding into the gas inlet chamber and positioned adjacent said ablator material, wherein said consumable ring is made from a material which erodes less rapidly than said ablator material.

14. The high temperature gas valve according to claim 13, wherein said ablator material protrudes into the gas inlet chamber a smaller distance than said consumable ring.

15. The high temperature gas valve according to claim 1, wherein said ablator material is comprised of material having little residue upon burning and which changes directly form a solid to a gaseous form.

16. The high temperature gas valve according to claim 1, wherein said ablator material comprises a phenolic material.

17. The high temperature gas valve according to claim 1, wherein said ablator material includes a first type of material selected from the group consisting of a paraffin material, a polyethylene material, a thermoplastic material, and an octadecane material.

18. The high temperature gas valve according to claim 17, wherein said ablator material is comprised of said first type of material and a second type of material, said second material selected from the group consisting of a graphite powder filler, a talcum powder filler; and a phase change salt filler.

\* \* \* \* \*